US008896763B1

(12) United States Patent
Chen

(10) Patent No.: US 8,896,763 B1
(45) Date of Patent: Nov. 25, 2014

(54) TELEVISION AND METHOD FOR SWITCHING TELEVISION CHANNELS

(71) Applicant: Hon Hai Precision Industry Co., Ltd., New Taipei (TW)

(72) Inventor: Hong-Sheng Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/014,369

(22) Filed: Aug. 30, 2013

(30) Foreign Application Priority Data

May 17, 2013 (TW) .............................. 102117665 A

(51) Int. Cl.
*H04N 5/50* (2006.01)
(52) U.S. Cl.
CPC ...................................... *H04N 5/50* (2013.01)
USPC ......................................................... 348/731
(58) Field of Classification Search
USPC .......... 348/731, 732, 725, 705, 706, 552, 553
See application file for complete search history.

(56) References Cited

U.S. PATENT DOCUMENTS

| 7,643,807 B2* | 1/2010 | Gupta et al. ............... 455/179.1 |
| 8,051,130 B2* | 11/2011 | Logan et al. .................. 709/204 |
| 8,219,509 B2* | 7/2012 | Ansari et al. .................... 706/12 |
| 8,345,171 B2* | 1/2013 | Watson et al. ................ 348/730 |
| 2007/0143816 A1* | 6/2007 | Gupta et al. .................. 725/135 |
| 2013/0003993 A1* | 1/2013 | Michalski et al. ............ 381/119 |
| 2013/0287212 A1* | 10/2013 | Marko et al. ...................... 381/2 |

* cited by examiner

*Primary Examiner* — Paulos M Natnael
(74) *Attorney, Agent, or Firm* — Novak Druce Connolly Bove + Quigg LLP

(57) ABSTRACT

A method for switching channels is applied in a television. A currently watched channel is set as a favorite channel. A return method for switching back to the favorite channel is set according to user input. A comparison object is set according to the set return method and user input. The television is switched from the favorite channel to a different channel. A time for switching back to the favorite channel is determined to whether or not arrive according to the set comparison object and the currently received content of the favorite channel. The television is switched back to the favorite channel when the time for switching back to the favorite channel arrives.

18 Claims, 3 Drawing Sheets

TELEVISION AND METHOD FOR SWITCHING TELEVISION CHANNELS

BACKGROUND

1. Technical Field

The present disclosure relates to televisions, and particularly to a television capable of automatically switching television channels and a related method.

2. Description of Related Art

A user can operate a channel set switch of a remote controller to instruct a television to switch channels when there is a commercial break. However, when the user perform channel switching by operating the channel set switch, it is difficult for the user to estimate the length of commercials and thus the user may lose the appropriate timing for restoring to the program on the former channel. Thus, the user may fail to see a part of the program broadcasted in a time period from the end of the commercial time period to the channel switching time point. Therefore, it is desirable to provide a method to solve the above-mentioned shortcomings.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure are described, with reference to the accompanying drawings.

Figure 1:
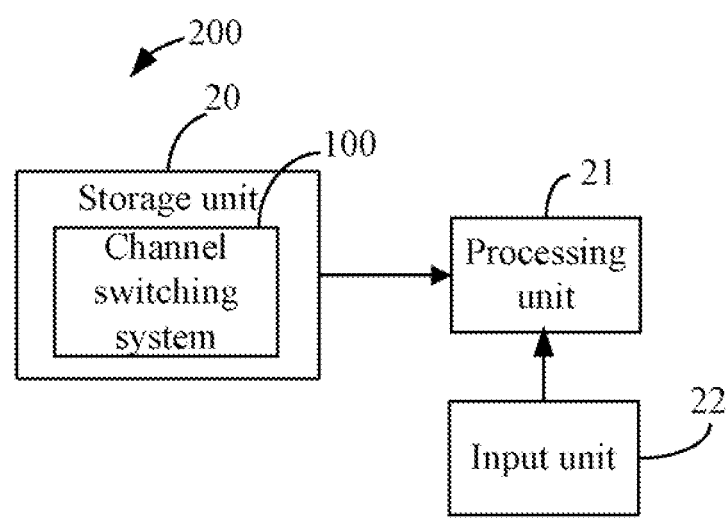
FIG. 1 is a block diagram of a television for switching television channels, in accordance with an exemplary embodiment.

FIG. 1 is an embodiment of a television 200. The television includes a storage unit 20, a processing unit 21, and an input unit 22. The input unit 22 may be a remote control or buttons of the television 200. The storage unit 20 stores a number of modules of a channel switching system 100. The processing unit 21 executes the number of modules of the channel switching system 100 to perform functions of the television 200.

Figure 2:
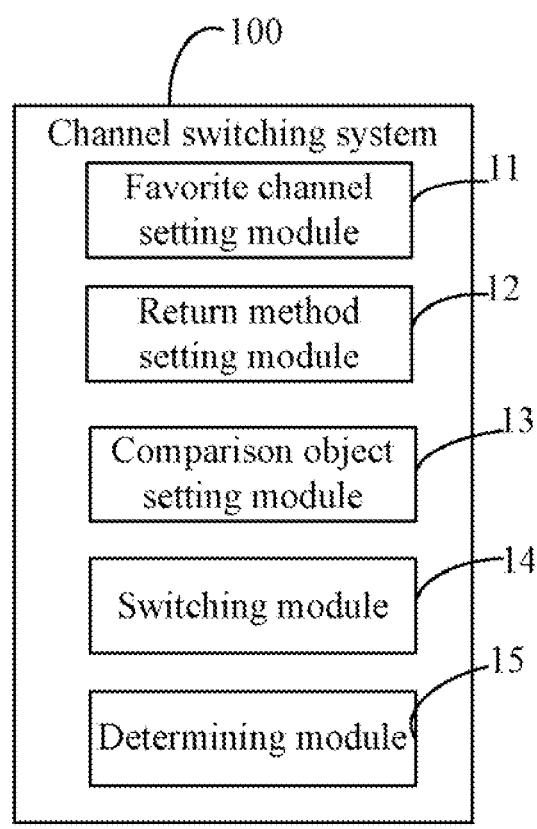
FIG. 2 is a block diagram of a channel switching system of the television of FIG. 1, in accordance with an exemplary embodiment.

FIG. 2 shows that the channel switching system 100 includes a favorite channel setting module 11, a return setting module 12, a comparison object setting module 13, a switching module 14, and a determining module 15 which are a collection of software instructions.

Figure 3:
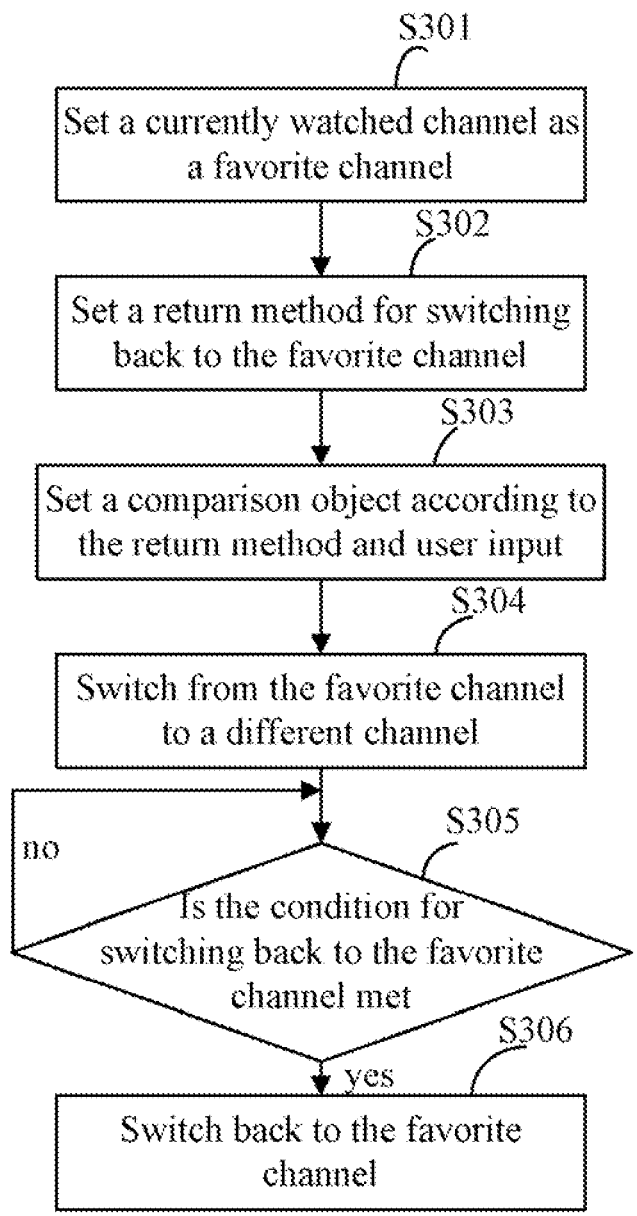
FIG. 3 is a flowchart of a method for switching television channels, in accordance with an exemplary embodiment.

FIG. 3 is a flowchart of a method for switching television channels, in accordance with an exemplary embodiment.

In step S301, the favorite channel setting module 11 sets a currently watched channel as a favorite channel in response to user input. A user can press a special button of the remote control to select the currently watched channel as a favorite channel.

In step S302, the return setting module 12 responds to an input to set a return method for switching back to the favorite channel. In this embodiment, the return setting module 12 displays a selection interface including a number of return methods for selection. In this embodiment, the return methods include a method of comparing images, a method of comparing sounds, and a method of recording time passing.

In step S303, the comparison object setting module 13 sets a comparison object according to the set return method and the input. In this embodiment, if the set return method is a method of comparing images, images of the beginning of a favorite program of the favorite channel may be selected by the user as a comparison object, such as an image including the program name of the favorite program for example. If the return method is a method of comparing sounds, sounds of the beginning of the favorite program of the favorite channel may be selected by the user as a comparison object, such as the opening song of the favorite program for example. The user can operate different function buttons of the remote control to instruct the television 200 to capture an image and record sounds of the beginning of the favorite program. If the return method is a method of recording time, a preset time period can be set by the user as a comparison object. The preset time period may be a commercial time period, for example.

In step S304, the switching module 14 switches the television 200 from the favorite channel to a different channel in response to an input. In the commercial time period, the user can operate the remote control to switch the television 200 to a different channel.

In step S305, the determining module 15 determines whether a time for switching back to the favorite channel arrives according to the set comparison object and the currently being played program of the favorite channel. If yes, the procedure goes to step S306, otherwise the procedure goes to step S305. If the set comparison object is an image or sounds of the beginning of a favorite program, the determining module 15 determines whether the comparison object appears in the currently received content of the favorite program after switching to a different channel. If yes, the determining module 15 determines that the time for switching back to the favorite channel arrives. In this embodiment, when a similar ratio between the comparison object and the currently received content of the favorite program reaches or is greater than a preset value, the determining module 15 determines that the time for switching back to the favorite channel arrives. If the set comparison object is the preset time period, the determining module 15 determines that the time for switching back to the favorite channel arrives when the preset time period elapses.

In step S306, the switching module 14 switches back to the favorite channel from a different channel. In an alternative embodiment, the switching module 14 prompts the user to switch back to the favorite channel. If the user selects to switch back to the favorite channel, the switching module 14 switches back to the favorite channel. Otherwise, the television 20 does not execute the automatically switching function.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A television comprising:
a storage unit storing a plurality of modules of a channel switching system; and a processing unit to execute the plurality of modules of the channel switching system to perform operations of automatically switching channels, the operations comprising:

setting a currently watched channel as a favorite channel;

set a return method for switching back to the favorite channel;

setting a comparison object according to the set return method and user's input;

switching the television from the favorite channel to a different channel;

determining whether a time for switching back to the favorite channel arrives according to the set comparison object and the currently received content of the favorite channel; and switching back to the favorite channel when the time for switching back to the favorite channel arrives.

2. The television as described in claim 1, wherein the set return method is a method of comparing images, the comparison object is an image comprising the program name of a favorite program of the favorite channel, when the comparison object appears in the currently being received content of the favorite program of the favorite channel after switching to the different channel, the time for switching back to the favorite channel arrives.

3. The television as described in claim 2, wherein when a similar ratio between the set comparison object and the currently being received content of the favorite channel reaches or is greater than a preset value, the time for switching back to the favorite channel arrives.

4. The television as described in claim 1, wherein the return method is a method of comparing sounds, the set comparison object is the opening song of a favorite program of the favorite channel, when the set comparison object appears in the currently being received content of the favorite channel, the time for switching back to the favorite channel arrives.

5. The television as described in claim 4, wherein when a similar ratio between the set comparison object and the currently being received content of the favorite channel reaches or is greater than a preset value, the time for switching back to the favorite channel arrives.

6. The television as described in claim 1, wherein the set return method is a method of recording time, the set comparison object is a preset time period, when the preset time period elapses after switching to the different channel, the time for switching back to the favorite channel arrives.

7. A method for switching channels applied in a television, the method comprising:

setting a currently watched channel as a favorite channel;

setting a return method for switching back to the favorite channel;

setting a comparison object according to the set return method and user's input;

switching the television from the favorite channel to a different channel;

determining whether a time for switching back to the favorite channel arrives according to the set comparison object and the currently received content of the favorite channel; and switching back to the favorite channel when the time for switching back to the favorite channel arrives.

8. The method as described in claim 7, wherein the set return method is a method of comparing images, the comparison object is an image comprising the program name of a favorite program of the favorite channel, when the comparison object appears in the currently being received content of the favorite program of the favorite channel after switching to the different channel, the time for switching back to the favorite channel arrives.

9. The method as described in claim 8, wherein when a similar ratio between the set comparison object and the currently being received content of the favorite channel reaches or is greater than a preset value, the time for switching back to the favorite channel arrives.

10. The method as described in claim 7, wherein the return method is a method of comparing sounds, the set comparison object is the opening song of a favorite program of the favorite channel, when the set comparison object appears in the currently being received content of the favorite channel, the time for switching back to the favorite channel arrives.

11. The method as described in claim 10, wherein when a similar ratio between the set comparison object and the currently being received content of the favorite channel reaches or is greater than a preset value, the time for switching back to the favorite channel arrives.

12. The method as described in claim 7, wherein the set return method is a method of recording time, the set comparison object is a preset time period, when the preset time period elapses after switching to the different channel, the time for switching back to the favorite channel arrives.

13. A non-transitory computer-readable storage medium encoded with a computer program, the program comprising instructions that when executed by one or more computers cause the one or more computers to perform operations of switching channels, the operations comprising:

setting a currently watched channel as a favorite channel;

setting a return method for switching back to the favorite channel;

setting a comparison object according to the set return method and user's input;

switching the television from the favorite channel to a different channel;

determining whether a time for switching back to the favorite channel arrives according to the set comparison object and the currently received content of the favorite channel; and switching back to the favorite channel when the time for switching back to the favorite channel arrives.

14. The non-transitory computer-readable storage medium as described in claim 13, wherein the set return method is a method of comparing images, the comparison object is an image comprising the program name of a favorite program of the favorite channel, when the comparison object appears in the currently being received content of the favorite program of the favorite channel after switching to the different channel, the time for switching back to the favorite channel arrives.

15. The non-transitory computer-readable storage medium as described in claim 14, wherein when a similar ratio between the set comparison object and the currently received content of the favorite channel reaches or is greater than a preset value, the time for switching back to the favorite channel arrives.

16. The non-transitory computer-readable storage medium as described in claim 13, wherein the return method is a method of comparing sounds, the set comparison object is the opening song of a favorite program of the favorite channel, when the set comparison object appears in the currently being received content of the favorite channel, the time for switching back to the favorite channel arrives.

17. The non-transitory computer-readable storage medium as described in claim 16, wherein when a similar ratio between the set comparison object and the currently being received content of the favorite channel reaches or is greater than a preset value, the time for switching back to the favorite channel arrives.

18. The non-transitory computer-readable storage medium as described in claim 13, wherein the set return method is a method of recording time, the set comparison object is a preset time period, when the preset time period elapses after switching to the different channel, the time for switching back to the favorite channel arrives.

* * * * *